United States Patent
Ahlers et al.

(12)

(10) Patent No.: US 6,523,167 B1
(45) Date of Patent: Feb. 18, 2003

(54) SPREADSHEET RECALCULATION ENGINE VERSION STAMP

(75) Inventors: Timothy Fred Ahlers, Redmond, WA (US); Andrew J. Becker, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/415,963

(22) Filed: Oct. 12, 1999

(51) Int. Cl.[7] .............................................. G06F 9/455
(52) U.S. Cl. ....................... 717/100; 717/100; 707/503; 707/504
(58) Field of Search ................................ 717/110, 113, 717/124, 127, 131, 100, 123, 170; 707/503, 504, 509, 538, 511

(56) References Cited

U.S. PATENT DOCUMENTS

| | | | | |
|---|---|---|---|---|
| 5,317,686 A | * | 5/1994 | Salas et al. ................ | 707/503 |
| 5,768,158 A | * | 6/1998 | Adler et al. ................ | 716/11 |
| 5,918,232 A | * | 6/1999 | Pouschine et al. .......... | 707/103 |
| 5,983,242 A | * | 11/1999 | Brown et al. ............... | 707/203 |
| 5,983,268 A | * | 11/1999 | Freivald et al. ............. | 709/218 |
| 6,041,267 A | * | 3/2000 | Dangat et al. .............. | 700/107 |
| 6,073,123 A | * | 6/2000 | Staley ........................ | 705/58 |
| 6,138,130 A | * | 10/2000 | Adler et al. ................ | 707/503 |
| 6,341,292 B1 | * | 1/2002 | Cho et al. ................... | 707/203 |
| 6,360,188 B1 | * | 3/2002 | Freidman et al. .............. | 703/1 |

OTHER PUBLICATIONS

Bowman, "A graphical user interface proposal for APL", ACM APL 1994, pp 17–22.*

Littlewood et al, "Modeling software design diversity– a review", ACM Computing Survey, vol. 33, No. 2, pp 177–208, Jun. 2001.*

* cited by examiner

Primary Examiner—Anil Khatri
(74) Attorney, Agent, or Firm—Merchant & Gould, P.C.; John E. Whitaker

(57) ABSTRACT

A recalculation engine version stamp is employed to determine whether a spreadsheet program file should be fully recalculated upon opening. When a spreadsheet program file is recalculated and saved, a recalculation engine version stamp is written to the file. The recalculation engine version stamp corresponds to the version of the calculation engine of the application program that last recalculated and saved the program file. When the program file is opened in a spreadsheet application program, the recalculation engine version stamp is compared to the calculation engine version number of the spreadsheet application program. If the calculation engine version number of the spreadsheet application program is more recent than the recalculation engine version stamp of the spreadsheet program file, then a full recalculation of the spreadsheet program file is performed.

20 Claims, 5 Drawing Sheets

SPREADSHEET RECALCULATION ENGINE VERSION STAMP

TECHNICAL FIELD

The present invention relates to an electronic spreadsheet software program, and is more particularly directed to a recalculation engine version stamp for a spreadsheet program.

BACKGROUND OF THE INVENTION

Spreadsheet programs, such as Microsoft's "EXCEL" spreadsheet, are useful tools in performing computational tasks such as keeping household budgets, work schedules, tracking bank accounts, maintaining inventories, and so on. As the use of personal computers within the home and business environments becomes more common, so too does the use of spreadsheet programs. The versatility of spreadsheet applications and the ease with which they are adapted to various tasks has resulted in their widespread use. With ongoing advances in the speed and capabilities of personal computers, enhanced features have been developed for spreadsheet programs.

A spreadsheet program is comprised of multiple cells arranged in rows and columns, with each individual cell containing its own data. An individual cell is usually identified by its column and row. For example, the cell that is located in column A at row 1 is referred to as "cell A1", the cell that is located in column C at row 5 is referred to as "cell C5", and so forth.

One of the benefits of a spreadsheet program is that the user can set up a dependency relationship among multiple cells in a spreadsheet. For example, a user may specify that the sum of two cells (A1 and A2) is reflected in a third cell A3 as SUM (A1:A2). The spreadsheet program will then automatically calculate the value of cell A3 by summing the values in cells A1 and A2. This eliminates the need for the user to manually calculate the value of the cell.

In the example above, cell A3 is said to "depend" on cells A1 and A2. That means that if the user changes the value of either cell A1 or cell A2, then the value in cell A3 needs to be recalculated. Most spreadsheet programs, including Microsoft "EXCEL", are designed to recognize these "dependency chains" and to recalculate the cells when necessary.

From time to time, calculation bugs are found in spreadsheet programs. These calculation bugs take the form of the user creating or modifying a spreadsheet in such a way that one of the cells of the spreadsheet evaluates to the wrong value. When these calculation bugs are identified by the developer of the spreadsheet program, a patch is commonly issued to repair the bugs in subsequent versions of the program. While this software patch is effective to prevent that particular calculation bug in the program files subsequently created, all previously saved program files may still exhibit the calculation bug. Thus, a user that opens a program file that was saved in an older version of the spreadsheet program, in order to be completely safe from the calculation bug, must perform a full recalculation of the file. Once a full recalculation is performed, the cells that evaluated incorrectly will have been reevaluated to the correct value.

Requiring the user to perform a full recalculation every time that a file is opened has many problems. One significant problem is performance, as a full recalculation of a program file can take a lot of time (e.g., even several hours for large program files). Moreover, the user has no way of knowing whether the full recalculation is actually necessary or not. That is to say, if a full recalculation is required for every instance, there will be occasions when the full recalculation is performed on a file that did not exhibit the calculation bug. Finally, even when a full recalculation is performed, the user may not be able to notice whether a change was effected.

Thus, there is a need for a mechanism for identifying whether a particular program file is likely to need a full recalculation when the file is opened. By only performing a full recalculation on those files likely to need it, users are spared from having to fully recalculate every single file.

SUMMARY OF THE INVENTION

The invention is a recalculation engine version stamp that provides a method for determining whether a particular spreadsheet program file is likely to need a full recalculation upon open. According to one aspect of the present invention, a "calculation engine version number" will be stored internally in the spreadsheet program. The calculation engine version number represents the current version of the program's calculation engine, not the version of the program itself. Thus, the calculation engine version number is different than and independent from any program version number that may be stored in the program.

According to another aspect of the present invention, when a file that has been calculated at least once is saved, the calculation engine version number of the program is written out and saved in the spreadsheet program file. The calculation engine version number that is saved in the spreadsheet program file is referred to as a "recalculation engine version stamp" because it identifies which version of the calculation engine was used when the file was last recalculated and saved. Accordingly, the recalculation engine version stamp enables the program to determine when newer versions of the calculation engine version number are available and to recalculate the program file at that time.

According to another aspect of the present invention, when a spreadsheet program file is opened, the recalculation engine version stamp is compared to the calculation engine version number of the program. If the numbers are the same, this would indicate that the program file was saved in the most current version of the calculation engine available. Thus, it would be of no benefit to perform a full recalculation on this file.

On the other hand, if the recalculation engine version number of the program file is older than the version of the calculation engine of the program used to open the file, this would indicate that the program file may contain calculation bugs and that the more recent calculation engine version number may repair those bugs. In this case, the program will perform a full recalculation of the program file.

More specifically described, the present invention is a method for determining whether a spreadsheet program file should be fully recalculated upon opening. According to the method, the spreadsheet program file is opened in a first spreadsheet application program, where the first spreadsheet application program has a first calculation engine version number. After at least one calculation operation is performed on the spreadsheet program file, the spreadsheet application program file is saved and a recalculation engine version stamp is written to the spreadsheet program file. The recalculation engine version stamp corresponds to the first calculation engine version number.

Subsequently, when the spreadsheet program file is opened in a second spreadsheet application program, the recalculation engine version stamp is compared to the calculation engine version number of the second spreadsheet application program. If the calculation engine version number of the second spreadsheet application program is more recent than the recalculation engine version stamp of the spreadsheet program file, then a full recalculation of the spreadsheet program file is performed.

DETAILED DESCRIPTION

The present invention is directed to a system and method for providing a recalculation engine version stamp in a spreadsheet. In an exemplary embodiment, the invention is incorporated into the "Microsoft Excel 2000 Spreadsheet", which is produced and distributed by Microsoft Corporation of Redmond, Washington. Briefly described, the recalculation engine version stamp provides a mechanism for determining whether a spreadsheet program file should be fully recalculated upon opening. The recalculation engine version stamp corresponds to the version of the calculation engine of the application program which last recalculated and saved the program file. Each time a spreadsheet program file is saved, a recalculation engine version stamp is written to the file. When the program file is opened in a spreadsheet application program, the recalculation engine version stamp is compared to the current calculation engine version number of the spreadsheet application program. If the calculation engine version number of the spreadsheet application program is more recent than the recalculation engine version stamp of the spreadsheet program file, then a full recalculation of the spreadsheet program file is performed.

The capabilities of the present invention will be described in greater detail herein below with respect to FIGS. 1–5, wherein like elements are represented by like numerals throughout the several figures.

Exemplary Operating Environment

Figure 1:
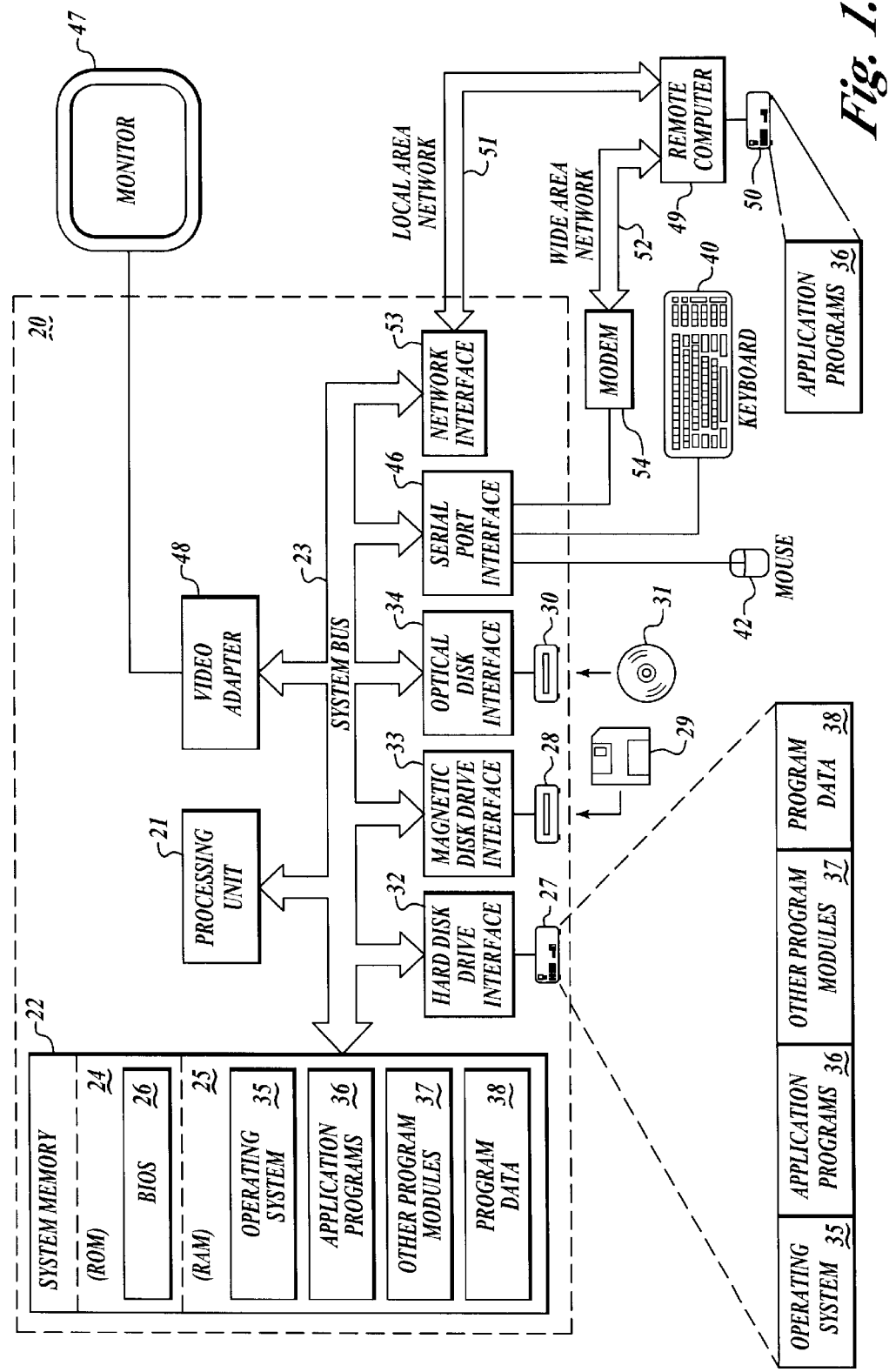
FIG. 1 is a block diagram of a personal computer that provides an exemplary operating environment for an exemplary embodiment of the present invention.

Now turning to FIG. 1, an exemplary operating environment in accordance with the exemplary embodiment of the present invention is now described.

FIG. 1 and the following discussion are intended to provide a brief, general description of a suitable computing environment in which the invention may be implemented. While the invention will be described in the general context of an application program that runs on an operating system in conjunction with a personal computer, those skilled in the art will recognize that the invention also may be implemented in combination with other program modules. Generally, program modules include routines, programs, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a conventional personal computer 20, including a processing unit 21, a system memory 22, and a system bus 23 that couples the system memory to the processing unit 21. The system memory 22 includes read only memory (ROM) 24 and random access memory (RAM) 25. A basic input/output system 26 (BIOS), containing the basic routines that help to transfer information between elements within the personal computer 20, such as during start-up, is stored in ROM 24. The personal computer 20 further includes a hard disk drive 27, a magnetic disk drive 28, e.g., to read from or write to a removable disk 29, and an optical disk drive 30, e.g., for reading a CD-ROM disk 31 or to read from or write to other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide nonvolatile storage for the personal computer 20. Although the description of computer-readable media above refers to a hard disk, a removable magnetic disk and a CD-ROM disk, it should be appreciated by those skilled in the art that other types of media which are readable by a computer, such as magnetic cassettes, flash memory cards, digital video disks, Bernoulli cartridges, and the like, may also be used in the exemplary operating environment.

A number of program modules may be stored in the drives and RAM 25, including an operating system 35, one or more application programs 36, a spreadsheet application program 37, and program data 38. A user may enter commands and information into the personal computer through conventional input devices, including a keyboard 40 and pointing device, such as a mouse 42. Other input devices (not shown) may include a pen, touch-operated device, microphone, joystick, game pad, satellite dish, scanner, or the like. These and other input devices are often connected to the processing unit 21 through a serial port interface 46 that is coupled to the system bus, but may be connected by other interfaces, such as a game port or a universal serial bus (USB). A display screen 47 or other type of display device is also connected to the system bus 23 via an interface, such as a video adapter 48. In addition to the display screen 47, personal computers typically include other peripheral output devices (not shown), such as speakers or printers.

The personal computer 20 may operate in a networked environment using logical connections to one or more remote computers, such as a remote computer 49. The remote computer 49 may be a server, a router, a peer device or other common network node, and typically includes many or all of the elements described relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets and the Internet.

When used in a LAN networking environment, the personal computer 20 is connected to the LAN 51 through a network interface 53. When used in a WAN networking environment, the personal computer 20 typically includes a modem 54 or other means for establishing communications over the WAN 52, such as the Internet. The modem 54, which may be internal or external, is connected to the system bus 23 via the serial port interface 46. In a networked environment, application programs depicted relative to the personal computer 20, or portions thereof, may be stored in the remote memory storage device. It will be appreciated that the network connections shown are exemplary and other means of establishing a communications link between the computers may be used.

Exemplary Method for Providing and Utilizing a Recalculation Engine Version Stamp Generally stated, the present invention is a recalculation engine version stamp for spreadsheet program files. More particularly, a "calculation engine version number" is stored internally in the spreadsheet program. The calculation engine version number represents the current version of the program's calculation engine, not the version of the program itself. Thus, the calculation engine version number is different than and independent from any program version number that may be stored in the program.

According to the present invention, when a file that has been calculated at least once is saved, the calculation engine version number of the program is written out and saved in the spreadsheet program file. The calculation engine version number that is saved in the spreadsheet program file is referred to as a "recalculation engine version stamp" because it identifies which version of the calculation engine was used when the file was last recalculated and saved. Accordingly, the recalculation engine version stamp enables the program to determine when newer versions of the calculation engine version number are available and to recalculate the program file at that time.

According to another aspect of the present invention, when a spreadsheet program file is opened, the recalculation engine version stamp is compared to the calculation engine version number of the program. If the numbers are the same, this would indicate that the program file was saved in the most current version of the calculation engine available. Thus, it would be of no benefit to perform a full recalculation on this file.

On the other hand, if the recalculation engine version number of the program file is older than the version of the calculation engine of the program used to open the file, this would indicate that the program fie may contain calculation bugs and that the more recent calculation engine version number may repair those bugs. In this case, the program will perform a full recalculation of the program file.

According to a preferred embodiment, the user will be given an option to "opt-out" of the recalculation engine version stamp methodology. That is, if the user has selected the appropriate "opt-out" key, then the program will not perform a full recalculation even if program file were saved in an older version of the calculation engine.

FIGS. 2–5 are flow charts that illustrate the use of the recalculation engine version stamp to identify those files that are likely to need a full recalculation and to perform a recalculation only on those files. Those skilled in the art will understand that the processes described by the flow charts of FIGS. 2–5 are executed by the processing unit 21 (FIG. 1) in response to instructions that have been incorporated into various program modules, including the operating system, spreadsheet application program 37, and so on.

Figure 2:
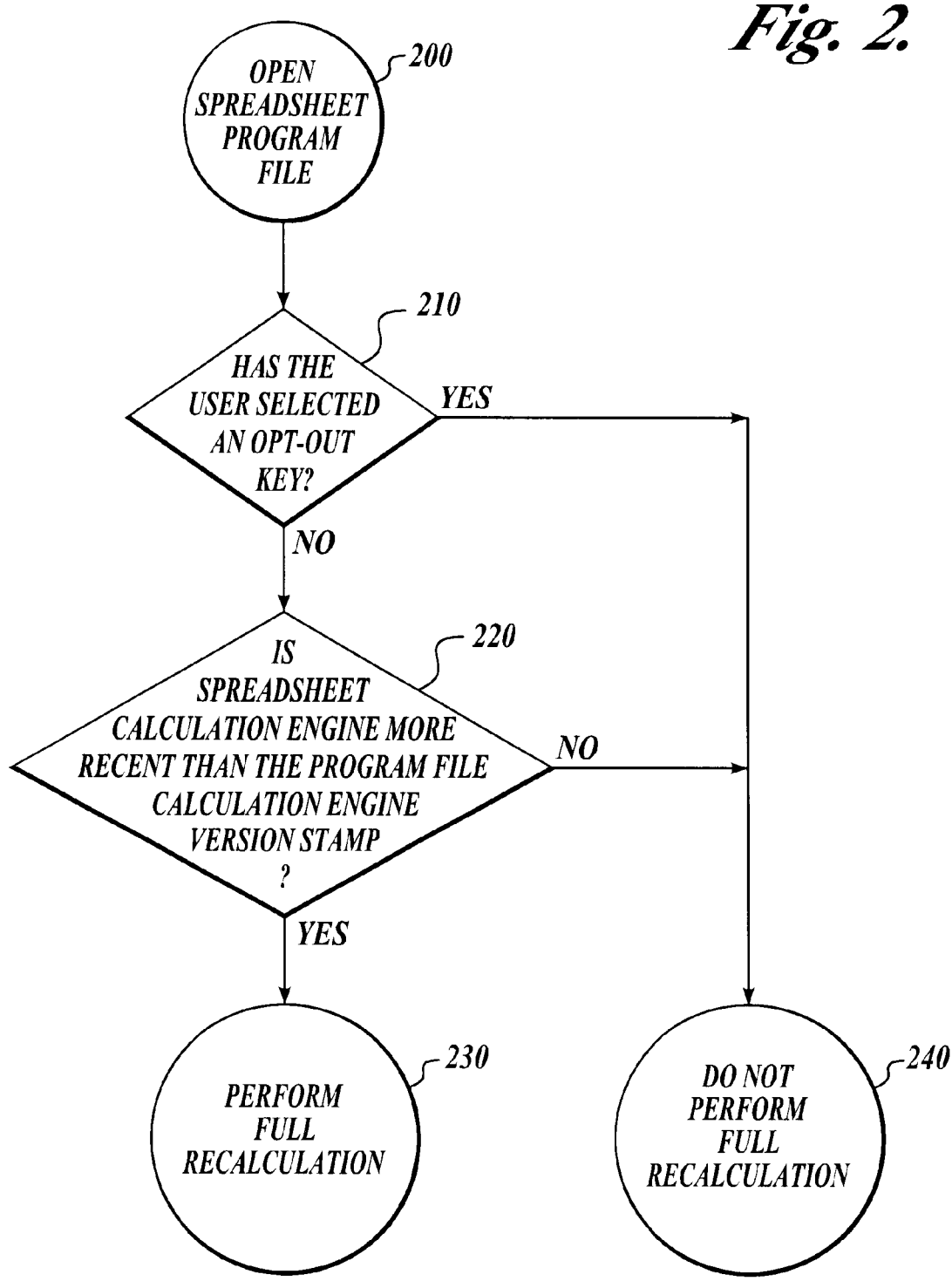
FIG. 2 is a flowchart illustrating a generic embodiment of a method for utilizing a recalculation engine version stamp in accordance with the present invention.

FIG. 2 is a flow chart depicting a generic embodiment of the present invention. The process depicted in FIG. 2 assumes that the spreadsheet program file being opened by the user already has a recalculation engine version stamp. Other scenarios will be discussed below.

Referring to FIG. 2, the process begins when the user opens a spreadsheet program file at step 200. At step 210, the program determines whether the user has a selected an opt-out key. If so, the process goes directly to step 240, in which the program will not perform a full recalculation of the program file. The user is then free to work in the file as normal.

On the other hand, if the user has not selected the opt-out key, then the process moves to step 220. There, the recalculation engine version stamp is compared to the calculation engine version number of the program used to open the file. If the calculation engine version number of the program is more recent than the recalculation engine version stamp of the program file, then the process moves to step 230, where a full recalculation of the program file is performed.

Alternatively, if the calculation engine version number of the program is not more recent than the recalculation engine version stamp of the program file, then the process moves to step 240, and a full recalculation of the program file is not performed.

Figure 3:
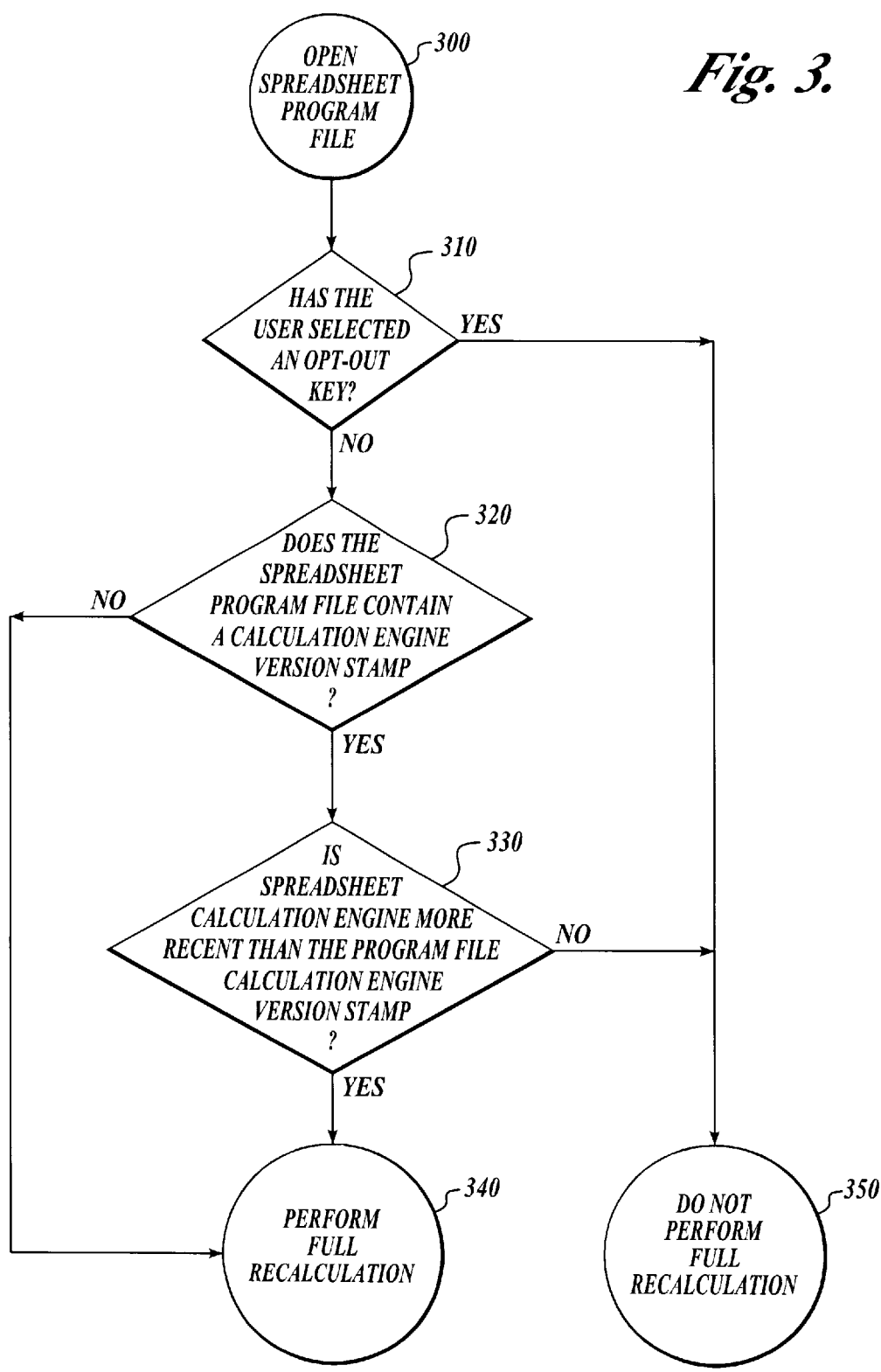
FIG. 3 is a flowchart illustrating an alternative generic embodiment of a method for utilizing a recalculation engine version stamp in accordance with the present invention.

FIG. 3 is a flow chart depicting an alternative generic embodiment of the present invention. Unlike the process depicted in FIG. 2, the process in FIG. 3 does not assume that the spreadsheet program file being opened by the user already has a recalculation engine version stamp.

Referring to FIG. 3, the process begins when the user opens a spreadsheet program file at step 300. At step 310, the program determines whether the user has a selected an opt-out key. If so, the process goes directly to step 350, in which the program will not perform a full recalculation of the program file. The user is then free to work in the file as normal.

On the other hand, if the user has not selected the opt-out key, then he process moves to step 320. There, the program determines whether he spreadsheet program file being opened contains a recalculation engine version stamp. If the file does not contain a recalculation engine version stamp, then the process moves directly to step 340, where a full recalculation of the file will be performed. The full recalculation is performed in this case because the absence of a recalculation engine version stamp in the file would indicate that the file was saved in an older version of the spreadsheet and thus, in all likelihood, an older version of the calculation engine.

On the other hand, if the file does contain a recalculation engine version stamp, then the process moves to step 330. There, the recalculation engine version stamp is compared to the calculation engine version number of the program used to open the file. If the calculation engine version number of the program is more recent than the recalculation engine version stamp of the program file, then the process moves to step 340, where a full recalculation of the program file is performed.

Alternatively, if the calculation engine version number of the program is not more recent than the recalculation engine version stamp of the program file, then the process moves to step 350, and a full recalculation of the program file is not performed.

Figure 4:
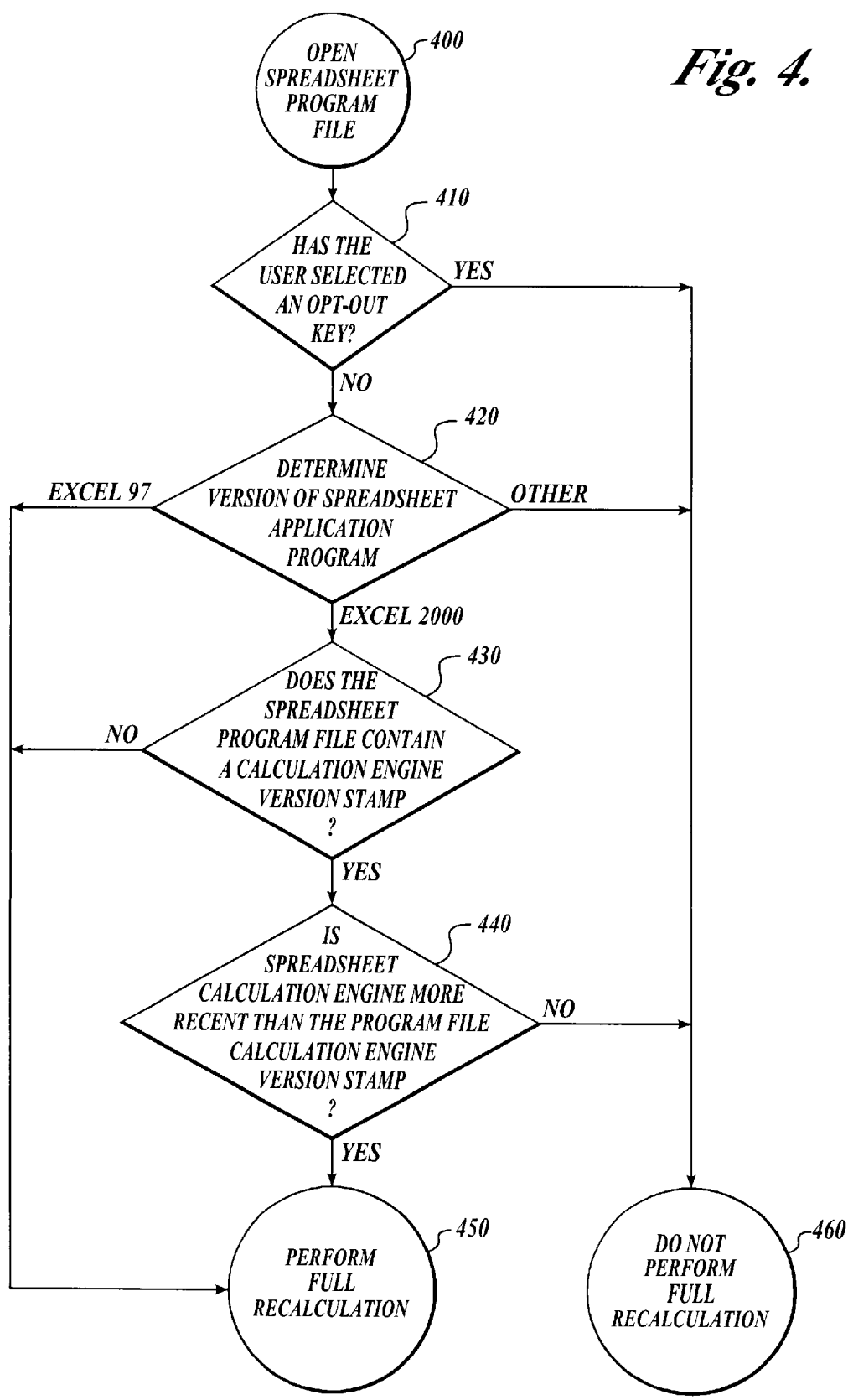
FIG. 4 is a flowchart illustrating a preferred embodiment of a method for utilizing a recalculation engine version stamp in accordance with the present invention.

FIG. 4 is a flow chart depicting a preferred embodiment of the present invention. According to the preferred embodiment, the present invention is incorporated into Microsoft's "EXCEL 2000" spreadsheet program.

Referring to FIG. 4, the process begins when the user opens a spreadsheet program file at step 400. At step 410, the program determines whether the user has a selected an opt-out key. If so, the process goes directly to step 460, in which the program will not perform a full recalculation of the program file. The user is then free to work in the file as normal.

On the other hand, if the user has not selected the opt-out key, then the process moves to step 420. There, the program determines what version of spreadsheet application program was used to create the program file. The application program will either be EXCEL 2000, EXCEL 97, or some other type of spreadsheet application program.

If program file was created in something other than EXCEL 2000 or EXCEL 97 (e.g., an older version of EXCEL), then the process moves directly to step 460 and a full recalculation will not be performed. If the program file was created in EXCEL 97, then the process moves directly to step 450 and a full recalculation will be performed.

If the program file was created in EXCEL 2000, then the process moves to step 430. In step 430, the program determines whether the spreadsheet program file being opened contains a recalculation engine version stamp. If the file does not contain a recalculation engine version stamp, then the process moves directly to step 450, where a full recalculation of the file is performed. The full recalculation is performed in this case because the absence of a recalculation engine version stamp in the file would indicate that the file was saved in an older version of the spreadsheet and thus, in all likelihood, an older version of the calculation engine.

On the other hand, if the file does contain a recalculation engine version stamp, then the process moves to step 440. In step 440, the recalculation engine version stamp is compared to the calculation engine version number of the program used to open the file. If the calculation engine version number of the program is more recent than the recalculation engine version stamp of the program file, then the process moves to step 450, where a full recalculation of the program file is performed.

Alternatively, if the calculation engine version number of the program is not more recent than the recalculation engine version stamp of the program file, then the process moves to step 460, and a full recalculation of the program file is not performed.

Figure 5:
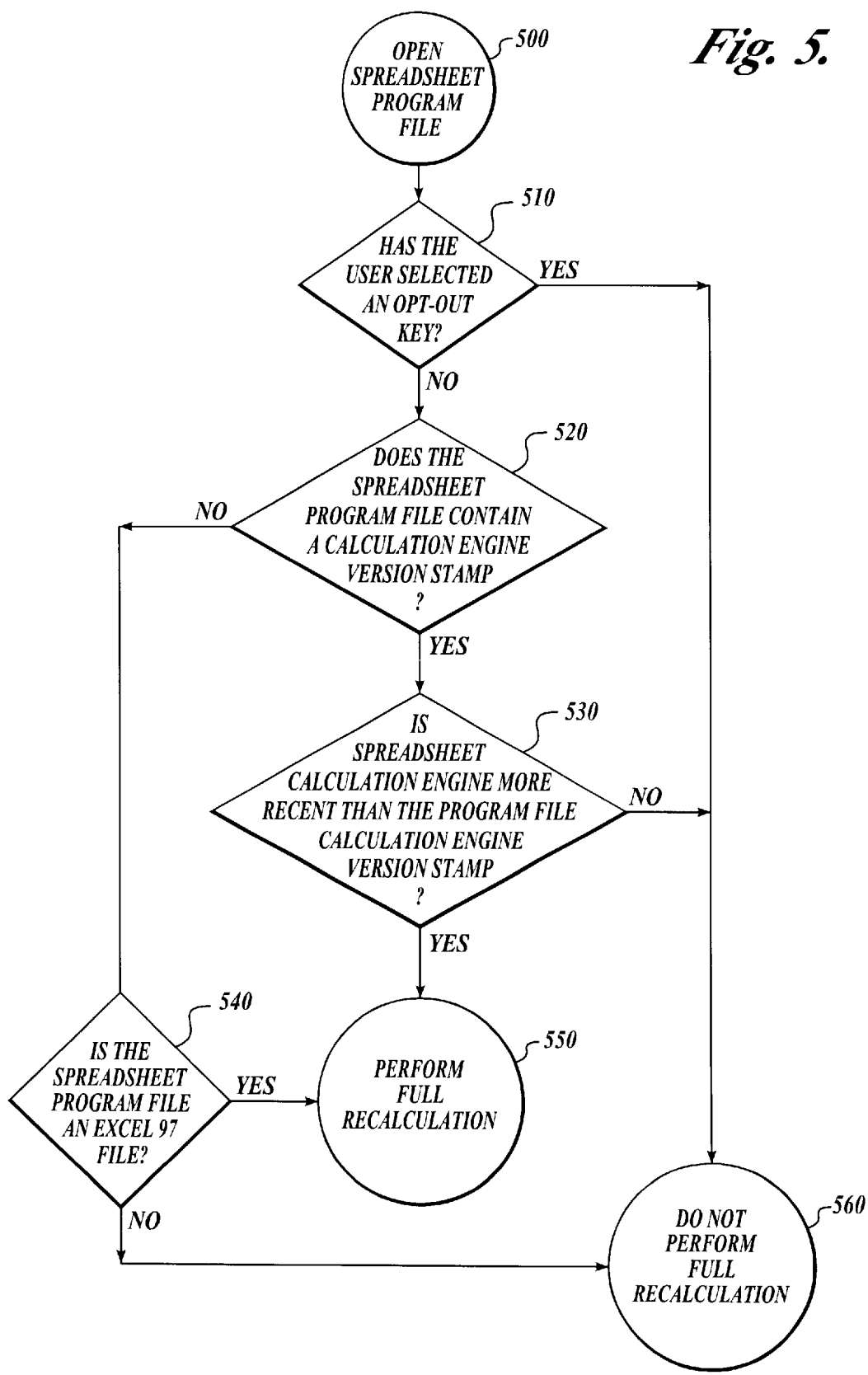
FIG. 5 is a flowchart illustrating an alternative preferred embodiment of a method for utilizing a recalculation engine version stamp in accordance with the present invention.

FIG. 5 is a flow chart of an alternative embodiment of the present invention. Referring to FIG. 5, the process begins when the user opens a spreadsheet program file at step 500. At step 510, the program determines whether the user has a selected an opt-out key. If so, the process goes directly to step 560, in which the program will not perform a full recalculation of the program file. The user is then free to work in the file as normal.

On the other hand, if the user has not selected the opt-out key, then the process moves to step 520. In step 520, the program determines whether the spreadsheet program file being opened contains a recalculation engine version stamp. If the file does not contain a recalculation engine version stamp, then the process moves to step 540. In step 540, the program determines if the whether the program file is an EXCEL 97 file. If so, process moves directly to step 550, where a full recalculation of the file is performed. If the program file is not an EXCEL 97 file, then the process moves directly to step 560, and a full recalculation will not be performed.

Returning to step 520, if the program file does contain a recalculation engine version stamp, then the process moves to step 530. There, the recalculation engine version stamp is compared to the calculation engine version number of the program used to open the file. If the calculation engine version number of the program is more recent than the recalculation engine version stamp of the program file, then the process moves to step 550, where a full recalculation of the program file is performed.

Alternatively, if the calculation engine version number of the program is not more recent than the recalculation engine version stamp of the program file, then the process moves to step 560, and a full recalculation of the program file is not performed.

It should be noted that the alternative embodiment shown in FIG. 5 assumes that all Excel 2000 files include a recalculation engine version stamp. In reality, the initial beta version of Excel 2000 did not write out a recalculation engine version stamp into files. Thus, it is possible, although not likely, to encounter an Excel 2000 file without a recalculation engine version stamp. In order to accommodate this possibility, it will be appreciated by those skilled in the art that it may be necessary to first determine whether an Excel 2000 file contains a recalculation engine version stamp before proceeding with the remaining steps of the process.

CONCLUSION

From the foregoing description, it will be appreciated that the present invention provides a unique and useful mechanism for determining whether a spreadsheet program file is likely to need a full recalculation in order to repair calculation bugs that may be present in the file. By only performing the full recalculation on those files that do not have a recalculation engine version stamp that is as recent as the version of the calculation engine of the program used to open the file, the user is spared from having to manually recalculate each and every file on open.

The invention may conveniently be implemented in one or more program modules and the flowcharts of FIGS. 2–5. No particular programming language has been described for carrying out the various procedures described above because it is considered that the operations, steps, and procedures described above and illustrated in the accompanying drawings are sufficiently disclosed to permit one of ordinary skill in the art to practice an exemplary embodiment. Moreover, there are many computers and operating systems which may be used in practicing an exemplary embodiment and therefore no detailed computer program could be provided which would be applicable to all of these many different systems. Each user of a particular computer will be aware of the language and tools which are most useful for that user's needs and purposes.

Although the preferred embodiment was described using an Microsoft "EXCEL 2000" as the exemplary program, those skilled in the art will appreciate that the preferred embodiment is not limited to this program, but may include any application program. Alternative embodiments will become apparent to those skilled in the art without departing from its spirit and scope. Accordingly, the scope of the present invention is defined by the appended claims rather than the foregoing description.

We claim:

1. A method for determining whether a spreadsheet program file should be fully recalculated upon opening, said method comprising the steps of:

opening the spreadsheet program file in a first spreadsheet application program, the first spreadsheet application program having a first calculation engine version number;

performing a calculation operation on the spreadsheet program file;

saving a recalculation engine version stamp to the spreadsheet program file, the recalculation engine version stamp corresponding to the first calculation engine version number;

closing the spreadsheet program file in the first spreadsheet application program;

opening the spreadsheet program file in a second spreadsheet application program, said second spreadsheet application program having a second calculation engine version number, the second calculation engine version number being more recent than the first calculation engine version number;

comparing the recalculation engine version stamp to the second calculation engine version number of the second spreadsheet application program; and if the second calculation engine version number of the second spreadsheet application program is more recent than the recalculation engine version stamp of the spreadsheet program file, performing a full recalculation of the spreadsheet program file.

2. A computer-readable medium on which is stored computer-executable instructions for performing the method of claim 1.

3. The method of claim 1, wherein the full recalculation comprises recalculating each calculated cell in the spreadsheet program file.

4. A method for determining whether a spreadsheet program file should be fully recalculated upon opening, said spreadsheet program file containing a recalculation engine version stamp corresponding to the version of the spreadsheet application program in which the spreadsheet program file was last recalculated and saved, said method comprising the steps of:

opening the spreadsheet program file in a spreadsheet application program, said spreadsheet application program having an internal calculation engine version number;

comparing the recalculation engine version stamp to the internal calculation engine version number of the spreadsheet application program; and if the internal calculation engine version number of the spreadsheet application program is more recent than the recalculation engine version stamp of the spreadsheet program file, performing a full recalculation of the spreadsheet program file.

5. The method of claim 4, further comprising the steps of:
determining whether the user has selected an opt out key;
in response to a determination that the user has selected an opt out key, then not allowing the spreadsheet application program to perform a full recalculation.

6. A computer-readable medium on which is stored computer-executable instructions for performing the method of claim 5.

7. A method for determining whether a spreadsheet program file should be fully recalculated upon opening, said method comprising the steps of:

opening the spreadsheet program file in a spreadsheet application program, said spreadsheet application program having an internal calculation engine version number;

determining whether the spreadsheet program file includes a recalculation engine version stamp;

if the spreadsheet program file contains a recalculation engine version stamp, then comparing the recalculation engine version stamp to the internal calculation engine version number of the spreadsheet program; and if the internal calculation engine version number of the spreadsheet application program is more recent than the recalculation engine version stamp of the spreadsheet program file, performing a full recalculation of the spreadsheet program file.

8. The method of claim 7, further comprising the steps of:
determining whether the user has selected an opt out key;
in response to a determination that the user has selected an opt out key, then not allowing the spreadsheet application program to perform a full recalculation.

9. A computer-readable medium on which is stored computer-executable instructions for performing the method of claim 8.

10. A method for determining whether a spreadsheet program file should be fully recalculated upon opening, said spreadsheet program file being created by an originating spreadsheet application program, said spreadsheet program file further having a program version stored therein, said program version corresponding to said originating spreadsheet application program, said method comprising the steps of:

opening the spreadsheet program file in a second spreadsheet application program, said second spreadsheet application program having an internal calculation engine version number;

in response to a determination of the program version of the spreadsheet program file, determining whether the spreadsheet program file includes a recalculation engine version stamp;

if the spreadsheet program file contains a recalculation engine version stamp, then comparing the recalculation engine version stamp to the internal calculation engine version number of the second spreadsheet application program; and if the internal calculation engine version number of the second spreadsheet application program is more recent than the recalculation engine version stamp of the spreadsheet program file, performing a full recalculation of the spreadsheet program file.

11. The method of claim 10, further comprising the steps of:
determining whether the user has selected an opt out key;
in response to a determination that the user has selected an opt out key, then not allowing the spreadsheet application program to perform a full recalculation.

12. A computer-readable medium on which is stored computer-executable instructions for performing the method of claim 11.

13. A method for determining whether a spreadsheet program file should be fully recalculated upon opening, said spreadsheet program file being created by an originating spreadsheet application program, said spreadsheet program file further having a program version stored therein, said program version corresponding to said originating spreadsheet application program, said method comprising the steps of:

opening the spreadsheet program file in a spreadsheet application program, said spreadsheet application program having a program version and an internal calculation engine version number;

determining whether the spreadsheet program file includes a recalculation engine version stamp;

if the spreadsheet program file does not contain a recalculation engine version stamp, then, in response to a determination of the program version of the spreadsheet program file, determining whether to fully recalculate the program file;

if the spreadsheet program file contains a recalculation engine version stamp, then comparing the recalculation engine version stamp to the internal calculation engine version number of the second spreadsheet application program; and if the internal calculation engine version number of the second spreadsheet application program is more recent than the recalculation engine version stamp of the spreadsheet program file, performing a full recalculation of the spreadsheet program file.

14. The method of claim 13, further comprising the steps of:

determining whether the user has set an opt out key;

in response to a determination that the user has set an opt out key, then not allowing the spreadsheet program to perform a full recalculation.

15. A computer-readable medium on which is stored computer-executable instructions for performing the method of claim 14.

16. A method for determining whether a spreadsheet program file should be fully recalculated upon opening, comprising:

opening a spreadsheet program file in a spreadsheet application program, the spreadsheet program file including a first spreadsheet application version number and a first calculation engine version number, the spreadsheet application program including a second spreadsheet application version number and a second calculation engine version number; and if the second calculation engine version number is more recent than the first calculation engine version number, performing a full recalculation of the spreadsheet program file.

17. The method of claim 16, further comprising:

if the second calculation engine version number is not more recent than the first calculation engine version number, preventing the full recalculation of the spreadsheet program file.

18. The method of claim 16, further comprising:

receiving a user indication that a full recalculation should not be performed; and in response to the user indication, not allowing the spreadsheet application program to perform the full recalculation.

19. The method of claim 16, wherein the first calculation engine version number is independent from the first spreadsheet application version number.

20. The method of claim 19, wherein the second calculation engine version number is independent from the second spreadsheet application version number.

* * * * *